United States Patent
Yeh et al.

(10) Patent No.: US 8,902,893 B2
(45) Date of Patent: *Dec. 2, 2014

(54) PACKET PROCESSING APPARATUS AND METHOD CAPABLE OF GENERATING MODIFIED PACKETS BY MODIFYING PAYLOADS OF SPECIFIC PACKETS IDENTIFIED FROM RECEIVED PACKETS

(75) Inventors: Chin-Wang Yeh, Hsinchu (TW); You-Min Yeh, Taipei (TW); Rong-Liang Chiou, Hsinchu (TW); Yu-Hsiung Deng, Hsin-Cju Hsien (TW); Ching-Chieh Wang, Yilan County (TW)

(73) Assignee: Mediatek Inc., Science-Based Indurtial Park, Hsin-Chu (TW)

( * ) Notice: Subject to any disclaimer, the term of this patent is extended or adjusted under 35 U.S.C. 154(b) by 456 days.

This patent is subject to a terminal disclaimer.

(21) Appl. No.: 12/633,726

(22) Filed: Dec. 8, 2009

(65) Prior Publication Data

US 2010/0158042 A1 Jun. 24, 2010

Related U.S. Application Data

(60) Provisional application No. 61/139,659, filed on Dec. 22, 2008, provisional application No. 61/139,662, filed on Dec. 22, 2008.

(51) Int. Cl.
*H04L 12/28* (2006.01)
*H04L 12/56* (2006.01)
(Continued)

(52) U.S. Cl.
CPC ..... *H04N 21/2389* (2013.01); *H04N 21/23608* (2013.01); *H04N 21/4385* (2013.01);
(Continued)

(58) Field of Classification Search
CPC .......... H04N 21/23608; H04N 21/434; H04N 21/4385; H04N 21/4425; H04N 21/64315; H04M 13/03; H04L 5/023

USPC .......... 370/389–394, 465–474; 714/776, 805, 714/52

See application file for complete search history.

(56) References Cited

U.S. PATENT DOCUMENTS

| 5,970,386 A | 10/1999 | Williams |
| 6,115,074 A | 9/2000 | Ozkan |

(Continued)

FOREIGN PATENT DOCUMENTS

| CN | 1722787 A | 1/2006 |
| CN | 101605204 A | 12/2009 |

(Continued)

OTHER PUBLICATIONS

International application No. PCT/CN2009/075755, International filing date: Dec. 21, 2009, International Search Report mailing date: Apr. 1, 2010, 10 pages.

(Continued)

*Primary Examiner* — Xavier Szewai Wong
(74) *Attorney, Agent, or Firm* — Winston Hsu; Scott Margo

(57) ABSTRACT

A packet processing apparatus includes a packet identifying unit and a packet modifying unit. The packet identifying unit is utilized for receiving a plurality of packets and checking identification information and data length information which are derived from the received packets to identify first packets from the received packets. The packet modifying unit is coupled to the packet identifying unit, and is utilized for checking payloads of the first packets to identify second packets from the first packets, where each of the second packets has specific data included in a payload thereof, and for modifying at least the payload of each of the second packets.

22 Claims, 13 Drawing Sheets

(51) Int. Cl.
*H04N 21/236* (2011.01)
*H04N 21/2389* (2011.01)
*H04N 21/4385* (2011.01)
*H04N 21/2362* (2011.01)
*H04N 21/434* (2011.01)
*H04N 21/426* (2011.01)
*H04J 3/16* (2006.01)
*H04J 3/22* (2006.01)
*H04J 3/24* (2006.01)
*H03M 13/00* (2006.01)
*G11C 29/00* (2006.01)

(52) U.S. Cl.
CPC ........ H04N 21/2362 (2013.01); H04N 21/434 (2013.01); H04N 21/426 (2013.01)
USPC ........... 370/392; 370/470; 370/474; 714/776; 714/805

(56) References Cited

U.S. PATENT DOCUMENTS

| | | | |
|---|---|---|---|
| 6,538,999 | B1 | 3/2003 | Sato |
| 7,899,929 | B1* | 3/2011 | Beser ............................ 709/238 |
| 8,199,750 | B1* | 6/2012 | Schultz et al. ................ 370/389 |
| 2003/0123484 | A1* | 7/2003 | Harriman ...................... 370/471 |
| 2004/0017831 | A1 | 1/2004 | Shen |
| 2004/0030776 | A1 | 2/2004 | Cantrell |
| 2006/0056407 | A1 | 3/2006 | Hashimoto |
| 2007/0088877 | A1 | 4/2007 | Chen |
| 2007/0130613 | A1 | 6/2007 | Choi |
| 2007/0160042 | A1 | 7/2007 | Dollo |
| 2008/0002742 | A1* | 1/2008 | Wu ................................ 370/476 |
| 2008/0008155 | A1 | 1/2008 | Yoon |
| 2008/0060046 | A1 | 3/2008 | Lee |
| 2008/0162639 | A1 | 7/2008 | Kang |
| 2008/0240093 | A1 | 10/2008 | Morad |
| 2009/0154480 | A1* | 6/2009 | Arai et al. ..................... 370/401 |
| 2010/0162089 | A1* | 6/2010 | Yeh et al. ...................... 714/807 |
| 2010/0229203 | A1* | 9/2010 | Lee ................................ 725/54 |

FOREIGN PATENT DOCUMENTS

| | | |
|---|---|---|
| EP | 1 217 838 A1 | 6/2002 |
| EP | 1 808 994 A1 | 7/2007 |
| EP | 1 909 420 A1 | 4/2008 |
| JP | P2008141618 A | 6/2008 |
| TW | 477139 | 2/2002 |
| TW | 200701788 | 1/2007 |
| WO | 0197526 A1 | 12/2001 |
| WO | 2006113302 A1 | 10/2006 |

OTHER PUBLICATIONS

International application No. PCT/CN2009/075773, International filing date: Dec. 21, 2009, International Search Report mailing date: Apr. 1, 2010, 10 pages.

International application No. PCT/CN2009/075761, International filing date: Dec. 21, 2009, International Search Report mailing date: Apr. 1, 2010, 12 pages.

Yeh, Title of Invention: Packet Processing Apparatus and Method Capable of Generating Modified Packets by Modifying Payloads of Specific Packets Identified From Received Packets, U.S. Appl. No. 12/624,411, filed Nov. 24, 2009.

Wang, Title of Invention: Signal Processing Apparatuses Capable of Processing Initially Reproduced Packets Prior to Buffering the Initially Reproduced Packets, U.S. Appl. No. 12/622,437, filed Nov. 20, 2009.

* cited by examiner

Bit Stream Syntax for the Terrestrial Virtual Channel Table

| Syntax | No. of Bits | Format |
|---|---|---|
| terrestrial_virtual_channel_table_section(){ | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_In_section | 8 | uimsbf |
|   for (i=0; i< num_channels_in_section; i++){ | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrie_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for (i=0; i< N; i++){ | | |
|       descriptor() | | |
|     } | | |
|   } | | |
|   reserved | 6 | '111111' |
|   additional_descriptors_length | 10 | uimsbf |
|   for (j=0; j< N; j++){ | | |
|     additional_descriptor() | | |
|   } | | |
|   CRC_32 | 32 | rpchof |
| } | | |

FIG. 4

Bit Stream Syntax for the Service Location Descriptor

| Syntax | No. of Bits | Format |
|---|---|---|
| service_location_descriptor(){ | | |
|    descriptor_tag | 8 | 0xC8 |
|    descriptor_length | 1 | '1' |
|    reserved | 1 | '1' |
|    PCR_PID | 2 | '11' |
|    number_elements | 12 | uimsbf |
|    for (i=0; i< number_elements; i++){ | | |
|       stream_type | 8 | uimsbf |
|       reserved | 3 | '111' |
|       elementary_PID | 13 | uimsbf |
|       ISO_639_language_code | 8*3 | uimsbf |
|    } | | |
| } | | |

PACKET PROCESSING APPARATUS AND METHOD CAPABLE OF GENERATING MODIFIED PACKETS BY MODIFYING PAYLOADS OF SPECIFIC PACKETS IDENTIFIED FROM RECEIVED PACKETS

CROSS REFERENCE TO RELATED APPLICATIONS

This application claims the benefit of U.S. Provisional Application No. 61/139,659 and U.S. Provisional Application No. 61/139,662, both filed on Dec. 22, 2008 and incorporated herein by reference.

BACKGROUND

The disclosed embodiments of the present invention relate to processing packets, and more particularly, to a packet processing apparatus and method capable of generating modified packets by modifying payloads of specific packets identified from received packets.

In contrast to the analog television system using analog signals to carry audio and video information, a digital television (DTV) system sends and receives audio and video information by means of digital signals. For example, at the transmitter end, the audio and video information to be transmitted is first packetized into transport stream (TS) packets, and then the TS packets are modulated and transmitted by broadcasting techniques. Regarding the receiver end, a demodulator block is required for demodulating a modulated input signal received via a tuner and an antenna to reproduce TS packets from the modulated input signal, and a demultiplexer block following the demodulator block is required to identify and demultiplex packets to store video information, audio information, program and system information protocol (PSIP) information corresponding to video packets, audio packets, and PSIP packets respectively into respective storage spaces. Next, the desired video information, audio information, and the program and system will be acquired for further processing.

In a conventional design, all of the received packets will be demultiplexed and then stored. However, certain packets demultiplexed and stored may carry unwanted information for a following signal processing state, which inevitably increases the packet processing burden of the following data processing stage.

SUMMARY

In accordance with exemplary embodiments of the present invention, a packet processing apparatus and method capable of generating modified packets by modifying payloads of specific packets identified from received packets are proposed. By way of example, not limitation, the unwanted information transmitted via specific packets identified from the received packets can be dropped or masked to alleviate the load of a following data processing stage, leading to higher packet processing efficiency, lower power consumption, and/or lower memory requirement.

According to one aspect of the present invention, an exemplary packet processing apparatus is disclosed. The exemplary packet processing apparatus includes a packet identifying unit and a packet modifying unit. The packet identifying unit is for receiving a plurality of packets and checking identification information and data length information which are derived from the received packets to identify first packets from the received packets. The packet modifying unit is coupled to the packet identifying unit, and is utilized for checking payloads of the first packets to identify second packets from the first packets, where each of the second packets has specific data included in a payload thereof, and modifying at least the payload of each of the second packets.

According to another aspect of the present invention, an exemplary packet processing method is disclosed. The exemplary packet processing method includes: receiving a plurality of packets and checking identification information and data length information which are derived from the received packets to identify first packets from the received packets; checking payloads of the first packets to identify second packets from the first packets, where each of the second packets has specific data included in a payload thereof; and modifying at least the payload of each of the second packets.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a diagram illustrating a bit stream syntax of a virtual channel table section.

FIG. 5 is a diagram illustrating a bit stream syntax of a service location descriptor.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The conception of the present invention is to check identification information derived from received packets (e.g., transport stream packets which comply with advanced television systems committee (ATSC) standard) to identify particular packets each having data of a required table section included in a payload thereof (e.g., any PSIP packet whose payload carrying data of a virtual channel table (VCT) section), check payloads of the particular packets to identify specific packets each having specific data of the required table section (e.g., data of a service location descriptor), and modify the payload of each of the identified specific packets to pre-process the unwanted information. As the unwanted information delivered by the identified specific packets is processed in advance, the packet processing burden of a following data processing stage can be effectively mitigated. Particularly, data of each of the specific packets are not stored into a storage device unless modified to become data of the corresponding modified packet. In other words, data of the identified specific packets are preferably changed prior to being buffered into a storage device. For clarity, certain exemplary embodiments of the present invention are disclosed as follows.

Figure 1:
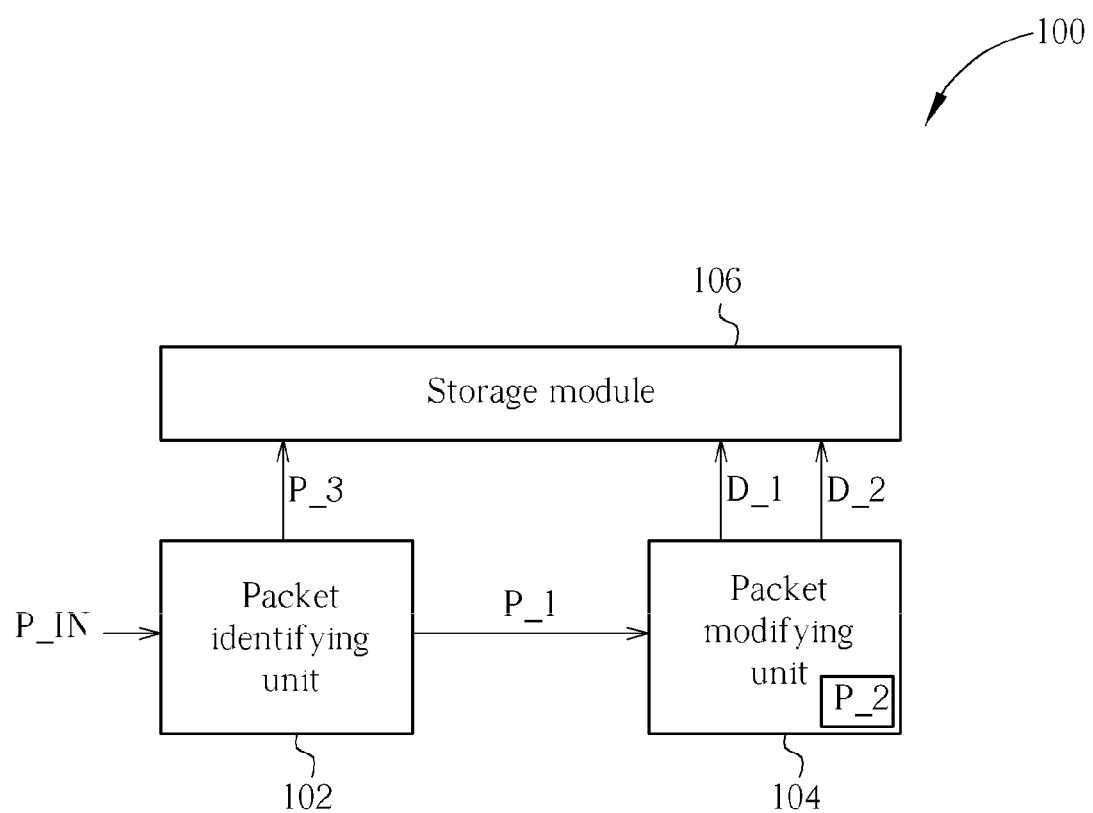
FIG. 1 is a block diagram of a first exemplary embodiment of a packet processing apparatus according to the present invention.

FIG. 1 is a block diagram of a first exemplary embodiment of a packet processing apparatus according to the present invention. The exemplary packet processing apparatus 100 includes, but is not limited to, a packet identifying unit 102, a packet modifying unit 104, and a storage module 106. The packet identifying unit 102 receives a plurality of packets P_IN, and checks identification information derived from the received packets P_IN to identify first packets P_1 from the received packets P_IN. By way of example, but not limitation, each of the first packets P_1 has the same packet identifier (PID) value. The packet identifying unit 102 transmits the identified first packets P_1 to the following packet modifying unit 104, and stores other packets P_3 of the received packets P_IN into the storage module 106. In other words, the output of the packet identifying unit 102 in this embodiment is in a packet format. With regard to the packet modifying unit 104, it is coupled to the packet identifying unit 102 and utilized for identifying second packets P_2 from the first packets P_1 identified by the packet identifying unit 102, where a payload of each of the second packets P_2 contains specific data to be processed. Next, the packet modifying unit 104 modifies at least the payload of each of the identified second packets P_2 to generate a modified packet, and stores data D_2 of the modified packet into the storage module 106. Data D_1 of the remaining first packets P_1 which are not identified as second packets P_2 are stored into the storage module 106 without any modification applied thereto. In short, any packet carrying unwanted information will be finally identified as the aforementioned second packet P_2 through the co-working packet identifying unit 102 and packet modifying unit 104.

It should be noted that the output of the packet modifying unit 104 may be a de-packetized result or in a packet format, depending upon design requirements. For example, in one exemplary implementation, the packet modifying unit 104 modifies the payload of each of the second packets P_2 to generate a modified packet, and stores modified packets respectively corresponding to the second packets P_2 into a packet buffer included in the storage module 106; besides, the packet modifying unit 104 passes the remaining first packets P_1 which are not identified as second packets P_2 to the packet buffer included in the storage module 106. The modified/unmodified packets generated from the packet modifying unit 104 will be further processed by the following data processing stage. In another exemplary implementation, the packet modifying unit 104 modifies the payload of each of the second packets P_2 to generate a modified packet having a modified payload included therein, and stores modified payloads respectively corresponding to the second packets P_2 into the storage module 106; besides, the packet modifying unit 104 stores payloads of the remaining first packets P_1 which are not identified as second packets P_2 to the storage module 106. Therefore, the de-packetized result of the modified/unmodified packets (i.e., payloads derived from the modified/unmodified packets) that is generated from the packet modifying unit 104 will be processed by the following data processing stage. To put it simply, the present invention does not limit the format of the output generated from the packet modifying unit 104; actually, any packet processing mechanism which identifies specific packets each having required data carried by a payload thereof and then changes payload contents of the identified specific packets falls within the scope of the present invention.

The storage module 106 can be implemented using any data storage element(s). For example, the storage module 106 may be a single memory (buffer) having storage areas respectively for different types of packets from the packet identifying unit 102 and the packet modifying unit 104; or the storage module 106 may be a combination of distinct memories (buffers) respectively assigned for different types of packets from the packet identifying unit 102 and the packet modifying unit 104. By way of example, but not limitation, data of each of the second packets P_2 received and identified through the co-working packet identifying unit 102 and packet modifying unit 104 is not stored into the storage module 106 unless modified by the packet modifying unit 104.

Figure 2:
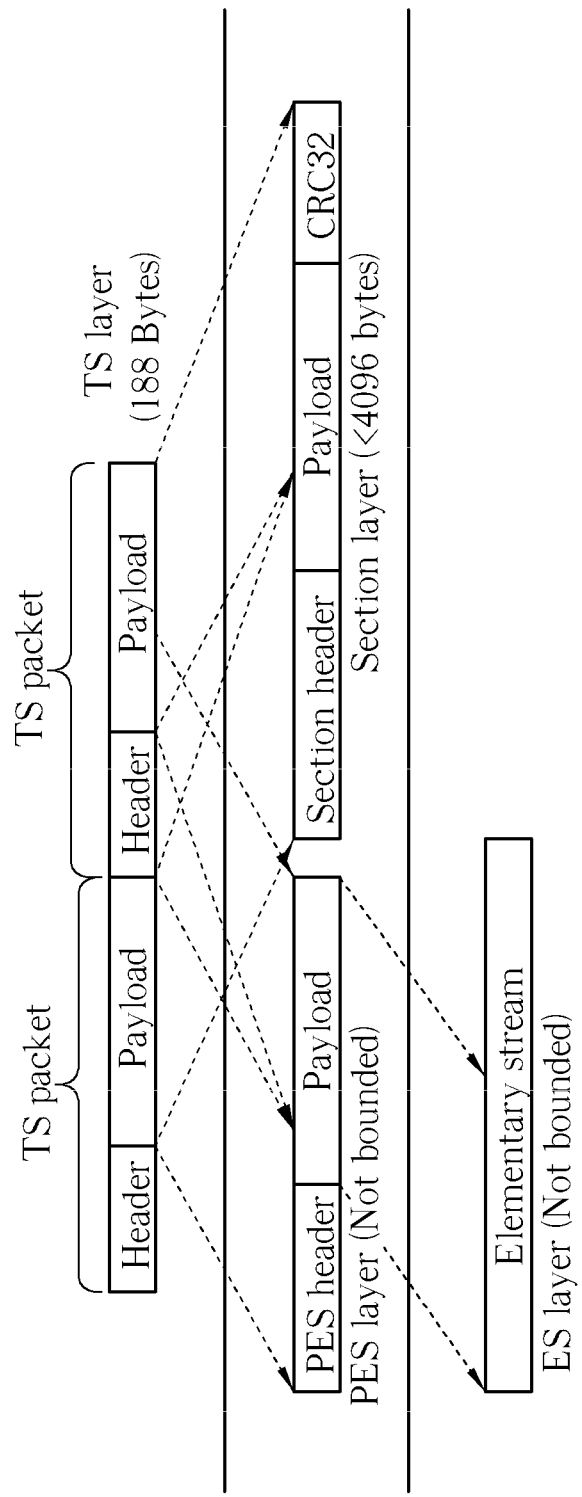
FIG. 2 is a diagram showing a transport stream hierarchy in terms of packet format.
Figure 3:
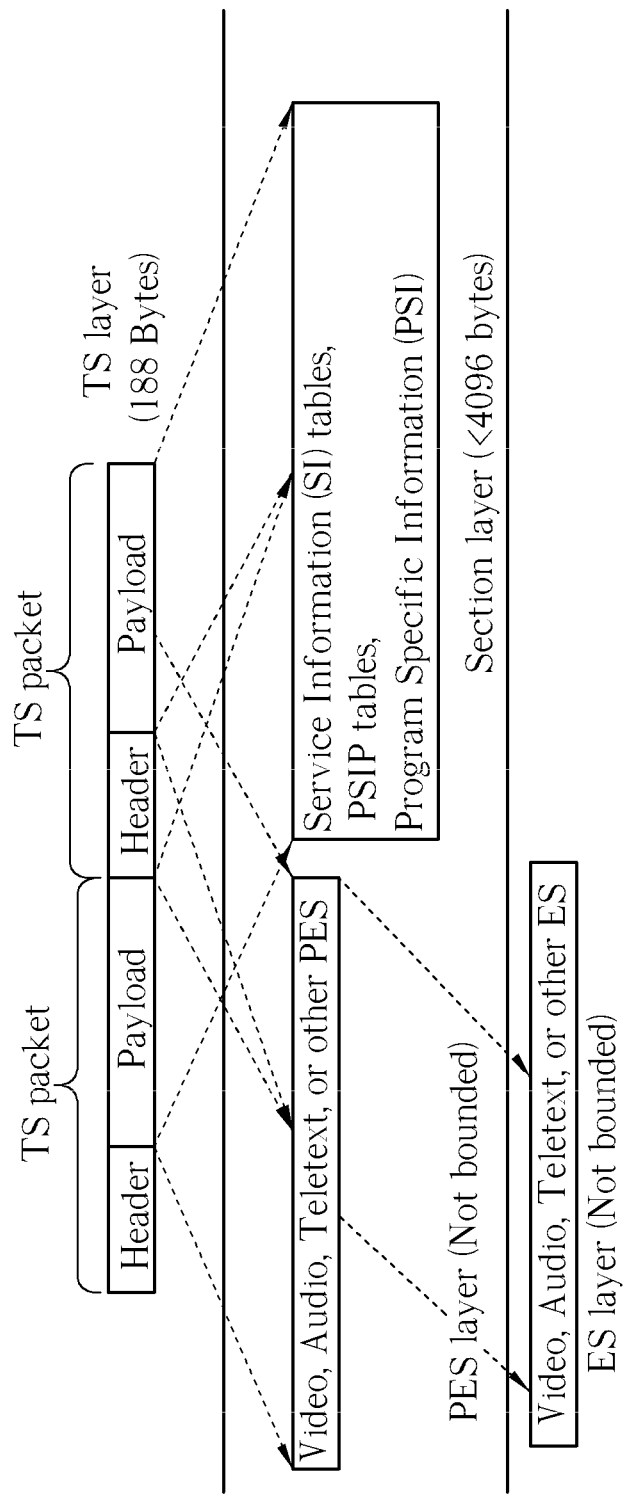
FIG. 3 is a diagram showing a transport stream hierarchy in terms of packet content.

To more clearly describe technical features of the exemplary embodiment shown in FIG. 1, the following takes MPEG compatible packets (e.g., TS packets complying with ATSC standard) as an example. The packet identifying unit 102 is capable of identifying any PSIP packet having a payload carrying data of a virtual channel table (VCT) section. Please refer to FIG. 2 in conjunction with FIG. 3. FIG. 2 is a diagram showing a transport stream hierarchy in terms of packet format, and FIG. 3 is a diagram showing a transport stream hierarchy in terms of packet content. As can be seen from these figures, each TS packet includes a header and a payload. It should be noted that a packet identifier (PID) value is included in the header for indicating the packet type. Payloads of the TS packets can form packet elementary stream (PES) packets and table sections. For example, payloads of the PES packets are used to transmit video data, audio data, etc., and payloads of the table sections are used to transmit service information (SI) tables, PSIP tables, program specific information (PSI), etc. In addition, payloads of the PES packets will form a plurality of elementary streams, such as a video elementary stream, an audio elementary stream, and a data elementary stream. Based on the transport stream hierarchy complying with the ATSC standard, the packet identifying unit 102 is capable of identifying the PSIP packet whose payload carries data of the VCT section, and the packet modifying unit 104 is capable of identifying PSIP packet whose payload carries descriptor data of the VCT section, such as data of a service location descriptor (SLD). For example, the packet identifying unit 102 receives a plurality of TS packets (e.g., P_IN) and compares PID values of the received TS packets with predetermined identification value(s) stored therein. In a case where a comparison result of a PID value of a TS packet and the predetermined identification value(s) indicates that the TS packet is a video packet or audio packet, the identified video/audio packet (e.g., P_3) is stored into a packet buffer included in the storage module 106. In another case where a comparison result of the PID value of a TS packet and the predetermined identification value(s) indicates that the TS packet is a PSIP packet, the packet identifying unit 102 checks if the payload of the PSIP packet contains data of a required table section. For example, if the payload of the PSIP packet includes a table ID of a table section, the packet identifying unit 102 extracts the table ID to determine whether the corresponding table section is a required table section, such as a VCT section. In general, each table section has a designated section length. Therefore, after a required table section is identified by the table ID, the data amount of the required table section can be readily known from the section length information extracted from the required table section. Based on the section length of the required table section, the packet identifying unit 102 knows if the following packets contain data of the required table section. That is, after a section length of a required table section is obtained, the packet with a payload carrying data of the required table section can be easily identified by counting data bits/bytes transmitted. The bit stream syntax of the VCT section is shown in FIG. 4. As can be seen from FIG. 4, the table ID 402 indicates that the table section is a VCT section, the section length 403 indicates the data amount of the VCT section, and the payload of the VCT section contains one or more descriptors 404, where one of the descriptors 404 may be a service location descriptor. Besides, in the end of the VCT section, a 32-bit cyclic redundancy check (CRC) code 406 is included for verifying data correctness of the VCT section.

As mentioned above, the packet identifying unit 102 checks PID values of the received packets P_IN. Therefore, the packet identifying unit 102 can also have the functionality of a conventional PID filter which identifies packet type of each received packet and provides index values to a following packet demultiplexer block to facilitate the packet demultiplexing operation.

When the payload of the PSIP packet contains data of the required table section (e.g., the VCT section), the PSIP packet is identified as the first packet P_1 mentioned above. Before making changes to the PSIP packet identified by the packet identifying unit 102, the packet modifying unit 104 has to determine if the payload of the PSIP packet contains specific data (e.g., descriptor data) in the required table section. By way of example, but not limitation, the packet modifying unit 104 is capable of searching for any PSIP packet having a payload carrying SLD data. The bit stream syntax of the service location descriptor is shown in FIG. 5. As can be seen from FIG. 5, the descriptor tag 502 indicates that the descriptor is a service location descriptor. Therefore, the packet modifying unit 104 checks the descriptor tag of a descriptor found in the VCT section to know if the descriptor is the desired descriptor (e.g., the service location descriptor). When the payload of the PSIP packet is found to contain SLD data, the packet modifying unit 104 categorizes the PSIP packet as a second packet P_2 mentioned above. When the payload of the PSIP packet has no SLD data included therein, the packet modifying unit 104 stores data D_1 of the PSIP packet (i.e., a first packet P_1 not identified as a second packet P_2) into the storage module 106.

It should be noted that a table section may be formed by payloads of a plurality of TS packets, and descriptor data of the table section may exist in payloads of some of the TS packets corresponding to the table section. The packet modifying unit 104 is therefore implemented to select second packets P_2 each having a payload carrying the required descriptor data (e.g., SLD data) from the first packets P_1 each having a payload carrying data of the required table section. In one exemplary implementation, the packet modifying unit 104 is configured to modify the payload of each of the second packets P_2 by dropping data of the at least one specific descriptor. Alternatively, the packet modifying unit 104 may be configured to modify the payload of each of the second packets P_2 by replacing data of the at least one specific descriptor with a predetermined data pattern (e.g., 0x00) which acts as a mask.

In general, the SLD data contain program map information; however, the program map information can also be derived from other tables transmitted via the transport stream. For instance, regarding each physical channel, a program association table (PAT) is also transmitted via a transport stream according to the MPEG standard. The PAT lists all programs available in the transport stream delivered via the corresponding physical channel, and each of the listed programs is identified by a program number. In addition, each of the programs listed in the PAT has an associated value of a PID value for its program map table (PMT) that describes which PIDs contain data relevant to the desired program. Even though the SLD data are unavailable from the transport stream, the desired mapping between a virtual channel number and a program number can still be obtained by information derived from these tables. Briefly summarized, the SLD data in the VCT section can be regarded as unwanted information since the program map information can be derived from other tables transmitted via the transport stream. It should be noted that the aforementioned SLD information to be dropped or masked merely serves as one example of the present invention. Other descriptor(s) in the VCT section transmitted via PSIP packets can be dropped or masked, depending upon design requirements. For example, in an exemplary design, all of the descriptors found in a required table section will be dropped or masked. This also obeys the spirit of the present invention.

In view of above, the packet modifying unit 104 pre-processes (drops or masks) detected descriptor(s) transmitted via payloads of the PSIP packets to effectively alleviate the packet processing load of the following data processing stage (e.g., a demultiplexer block). When the unwanted information is masked by a predetermined data pattern (e.g., 0x00), the power consumption can be effectively reduced due to lower transition frequency of the binary bits. When the unwanted information is dropped, the buffering size can be effectively reduced due to reduced data amount.

Please note that the manner for identifying the second packets P_2 from the incoming packets P_IN is not limited to checking the PID value, the table ID, the section length and/or the descriptor tag. Any means capable of identifying particular packets each having data of a required table section included in a payload thereof and then checking payloads of the particular packets to identify specific packets each having specific data of the required table section can be employed by the packet processing apparatus 100.

Figure 6:
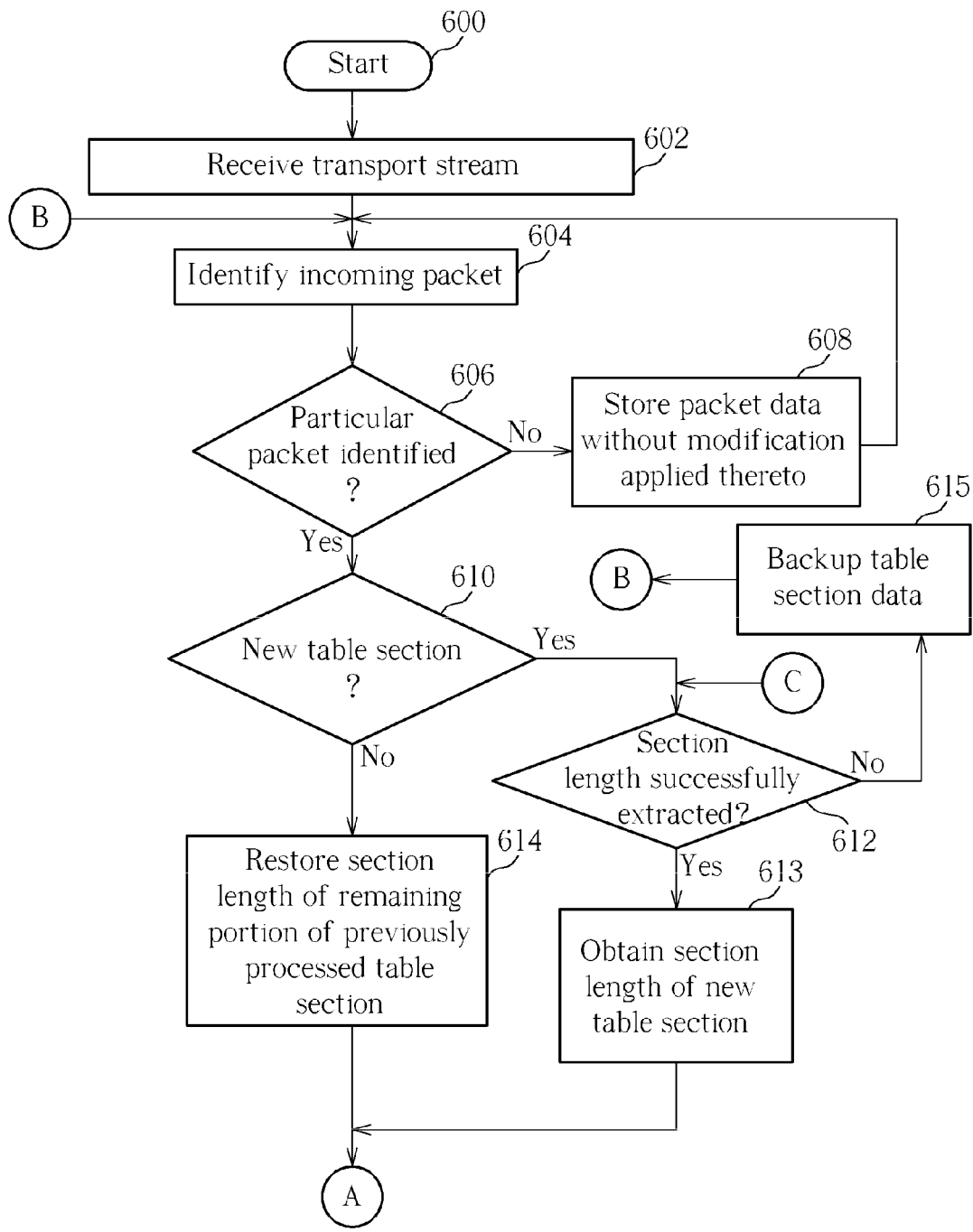
FIG. 6 is a flowchart illustrating a first exemplary embodiment of a packet processing method according to the present invention.
Figure 7:
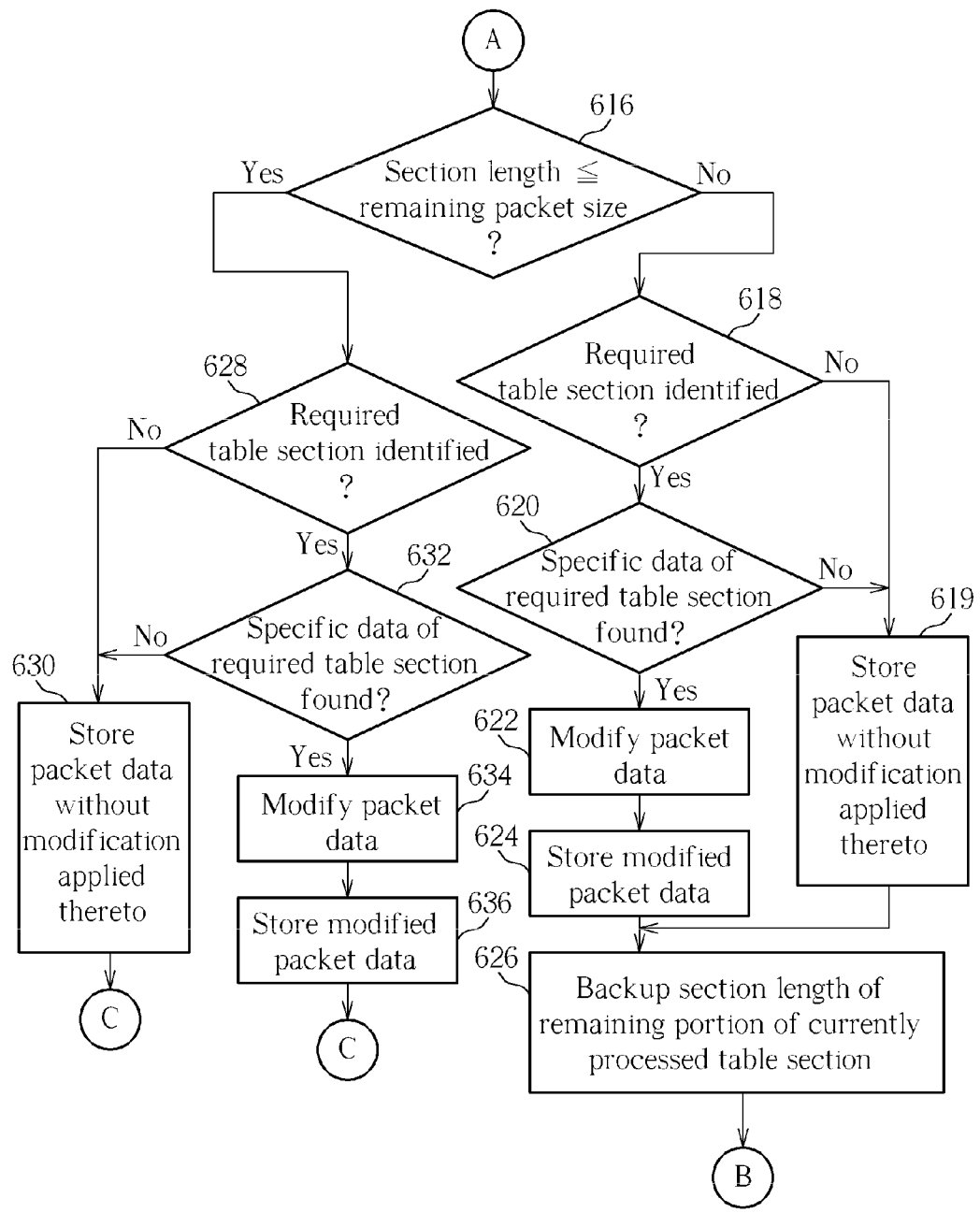
FIG. 7 shows a continued flow of FIG. 6.

Please refer to FIG. 6 in conjunction with FIG. 7. FIG. 6 is a flowchart illustrating a first exemplary embodiment of a packet processing method according to the present invention. FIG. 7 shows a continued flow of FIG. 6. Provided that the result is substantially the same, the steps are not required to be performed in the exact order shown in FIG. 6 and FIG. 7. In this exemplary embodiment, the method is employed by the packet processing apparatus 100 shown in FIG. 1. The exemplary method of the present invention includes following steps:

Step 600: Start.

Step 602: Receive a transport stream generated from a preceding data processing stage (e.g., a demodulator block), where the transport stream transmits a plurality of packets (i.e., transport stream packets) successively.

Step 604: Perform a packet header detection upon the transport stream for identifying an incoming packet transmitted via the transport stream.

Step 606: Check a PID value of the incoming packet to see if the incoming packet is a particular packet (e.g., a PSIP packet). If yes, go to step 610; otherwise, go to step 608.

Step 608: Store the packet without any modification applied thereto, and then go to step 604 to identify the next incoming packet transmitted via the transport stream.

Step 610: Check if an initial data of the payload of the particular packet contains information of a new table section whose section length is not successfully extracted yet. If yes, go to step 612; otherwise, go to step 614.

Step 612: Check if a section length of a new table section can be successfully derived from the particular packet. If yes, go to step 613; otherwise, go to step 615.

Step 613: Obtain a section length of a new table section. For example, the section length of the new table section may be derived from the processing of table section data included in one particular packet, or derived from the processing of table section data and continued table section data respectively included in different packets. Go to step 616.

Step 614: Restore a section length of a remaining portion of a previously processed table section. Go to step 616.

Step 615: Backup table section data required for obtaining a section length, and go to step 604.

Step 616: Check if the section length is equal to or less than a size of a non-processed portion of the particular packet, where the non-processed portion of the particular packet may include all or partial data of the particular packet, depending upon the actual processing status of the particular packet. If yes, go to step 628; otherwise, go to step 618.

Step 618: Check if the non-processed portion of the particular packet includes data of a required table section (e.g., a VCT section). If yes, go to step 620; otherwise, go to step 619.

Step 619: Store data of the non-processed portion of the particular packet without any modification applied thereto, and then go to step 626.

Step 620: Check if the non-processed portion of the particular packet includes specific data of the required table section. If yes, go to step 622; otherwise, go to step 619. For example, the VCT section is checked to see if the non-processed portion of the particular packet contains data of one or more descriptors. Alternatively, a descriptor tag of each descriptor in the VCT section is checked to see if the non-processed portion of the particular packet contains data of one or more target descriptors, such as SLD data.

Step 622: Modify at least the data of the non-processed portion of the particular packet to generate a modified portion of a modified packet corresponding to the particular packet. For example, the modified portion of the corresponding modified packet is generated by dropping or masking data of one or more target descriptors of the required table section.

Step 624: Store data of the modified portion of the modified packet.

Step 626: Backup a section length of a remaining portion of the currently processed table section, and then go to step 604 to identify the next incoming packet transmitted via the transport stream.

Step 628: Check if data of the section length includes data of a required table section. If yes, go to step 632; otherwise, go to step 630.

Step 630: Store the data of the section length without data modification applied thereto, and then go to step 612 to process a next table section including all or partial data transmitted via the same particular packet.

Step 632: Check if data of the section length includes specific data of the required table section. If yes, go to step 634; otherwise, go to step 630. For example, the VCT section is checked to see if the data of the section length contains one or more descriptors. Alternatively, a descriptor tag of each descriptor included in the VCT section is checked to see if the data of the section length contains one or more target descriptors.

Step 634: Modify at least the data of the section length to generate a modified data of a modified packet corresponding to the particular packet. For example, the modified data is generated by dropping or masking data of one or more descriptors of the required table section.

Step 636: Store the modified data of the modified packet, and then go to step 612 to process a next table section including all or partial data transmitted via the same particular packet.

As a table section may have data transmitted by one or more packets of the transport stream, a section length of the table section can be referenced to identify the end of the table section, which facilitates the data processing of the table section. For example, the packet identifying unit 102 and the packet modifying unit 104 can easily know if the input data is an end of a required table section by referring to the section length of the required table section. In addition, if a payload of a previously identified particular packet is found to carrying data of a required table section, the section length parameter derived from data of the required table section can be checked to see if a payload of a currently identified particular packet carries continued data of the required table section. In other words, the section length can provide useful information to the packet identifying unit 102. Thus, in addition to checking a table ID of a required table section whose data are transmitted via more than one packet, the packet identifying unit 102 can refer to a section length of the required table section to know if a payload of an identified particular packet carries data of the required table section. Steps 610, 612, 613, 614, and 616 are therefore executed to determine whether an identified particular packet (e.g., a PSIP packet) carries data of more than one table section or only partial data of a single table section, and enables a proper data processing flow accordingly. In addition, when step 626 is allowed to be executed, implying that the end of the currently processed table section is not reached yet, the section length will be updated to record the size of the remaining portion of the table section to facilitate the following data processing of the same table section.

To more clearly describe technical features directed to the use of the section length, certain exemplary cases are discussed hereinafter. In a first case where an initial data of the payload of the identified particular packet is a beginning of a new table section and the payload of the identified particular packet only contains partial data of the new table section (i.e., data of the table section is transmitted by a plurality of transport stream packets), step 613 obtains a section length of the new table section starting from the beginning of the payload of the currently identified particular packet, and step 618 is executed since step 616 will determine that the section length of the new table section is greater than the size of the non-processed portion of the currently identified particular packet (i.e., the packet size of the currently identified particular packet).

In a second case where an initial data of the payload of the identified particular packet is a beginning of a new table section and the payload of the identified particular packet contains data of more than one table section, step 613 obtains a section length of the new table section starting from the beginning of the payload of the currently identified particular packet, and step 628 is executed since step 616 will determine that the section length of the new table section is not greater than the size of the non-processed portion of the currently identified particular packet (i.e., the original packet size of the currently identified particular packet); additionally, after the leading table section has been processed, the flow returns to step 613 for deriving a section length of a next table section following the leading table section, where the size of the non-processed portion of the identified particular packet is now equal to the original packet size of the identified particular packet minus the section length of the processed table section. As a person skilled in the art can readily understand the following data processing flow after reading above description, further details are omitted for brevity.

In a third case where an initial data of the payload of the identified particular packet is not a beginning of a new table section (i.e., data of a table section is transmitted by a plurality of transport stream packets and the payload of the currently identified particular packet begins with continued data of the table section) and the payload of the identified particular packet contains partial data of the table section only, step 614 restores a section length of a remaining portion of the previously processed table section, and step 618 is executed since step 616 will determine that the section length, recording the size of the remaining portion of the table section which has been processed previously, is greater than the size of the non-processed portion of the currently identified particular packet (i.e., the original packet size of the currently identified particular packet).

In a fourth case where an initial data of the payload of the identified particular packet is not a beginning of a new table section (i.e., data of a table section is transmitted by a plurality of transport stream packets and the payload of the currently identified particular packet begins with continued data of the table section) and the payload of the identified particular packet contains data of more than one table section, step 614 restores a section length of a remaining portion of the previously processed table section, and step 628 is executed since step 616 will determine that the section length, recording the size of the remaining portion of the table section which has been processed previously, is not greater than the size of the non-processed portion of the currently identified particular packet (i.e., the original packet size of the currently identified particular packet); additionally, after the remaining portion of the previously processed table section has been processed, the flow returns to step 613 for deriving a section length of a next table section, where the size of the non-processed portion of the identified particular packet is now equal to the original packet size of the identified particular packet minus the section length of the remaining portion of the previously processed table section. As a person skilled in the art can readily understand the following data processing flow after reading above description, further details are omitted for brevity.

Briefly summarized, no matter whether the payload of a particular packet (e.g., a PSIP packet) carries all or partial data of a table section, the flow shown in FIG. 6 and FIG. 7 is capable of modifying a payload of each specific packet which transmits specific data of a required table section (e.g., SLD data of a VCT section) to achieve the objective of pre-processing the unwanted information.

It should be noted that the flow shown in FIG. 6 and FIG. 7 is employed to process a transport stream. Thus, the flow shown in FIG. 6 and FIG. 7 will check the incoming data to thereby process each packet received by the packet processing apparatus 100. As a person skilled in the art can readily understand the operation of each step shown in FIG. 6 and FIG. 7 after reading above paragraphs directed to the packet processing apparatus 100 shown in FIG. 1 and the flow shown in FIG. 6 and FIG. 7, further description is omitted here for brevity.

In above exemplary embodiment, the packet modifying unit 104 modifies the payload of each of the second packets P_2 to generate a corresponding modified packet. In other words, the payload content of the modified packet generated from the packet modifying unit 104 is different from that of the corresponding second packet P_2. In a case where an error-checking code, such as a cyclic redundancy check (CRC) code, is included in the second packet P_2 to verify data correctness, an error check must be applied to the second packet P_2 instead of the modified packet to retain the benefit of using the CRC code for data correctness verification; otherwise, the intended error-checking functionality would fail to work properly. In the following, exemplary packet processing apparatuses which support the error-checking functionality are proposed.

Figure 8:
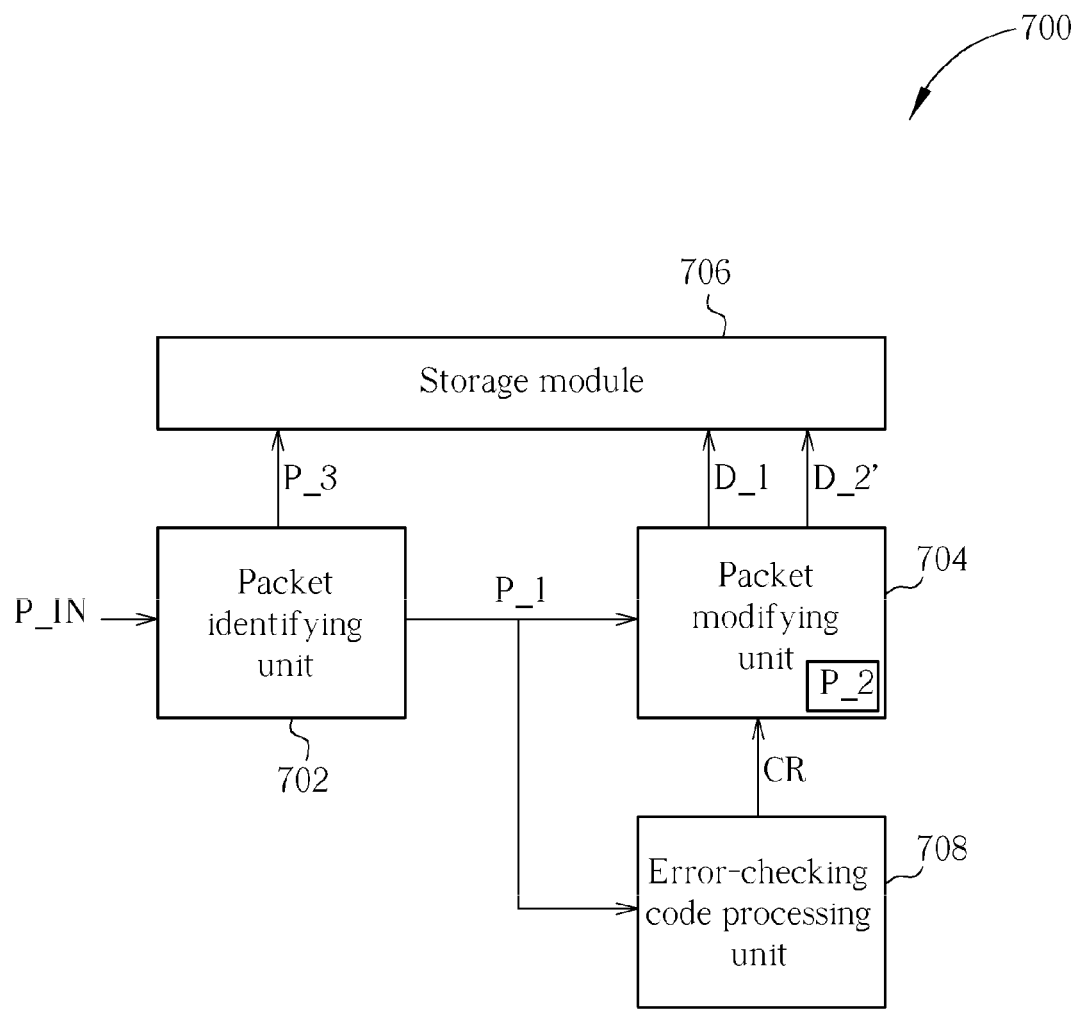
FIG. 8 is a block diagram of a second exemplary embodiment of a packet processing apparatus according to the present invention.

Please refer to FIG. 8, which is a block diagram of a second exemplary embodiment of a packet processing apparatus according to the present invention. The exemplary packet processing apparatus 700 includes, but is not limited to, a packet identifying unit 702, a packet modifying unit 704, a storage module 706, and an error-checking code processing unit 708. As the operation and function of the packet identifying unit 702 are identical to that of the packet identifying unit 102 shown in FIG. 1 and the operation and function of the storage module 706 are identical to that of the storage module 106 shown in FIG. 1, further description is therefore omitted here for brevity. The error-checking code processing unit 708 is utilized for referring to an original error-checking code of a specific table section, which is a specific data section, to perform an error check (e.g., a cyclic redundancy check) upon the specific table section whose data are transmitted via first packets P_1 identified by the packet identifying unit 702, and then generating an error checking result CR of performing the error check upon the specific table section. The error checking result CR is indicative of data correctness of the specific table section. In other words, the error checking result CR is generated in response to the error check applied to the specific table section derived from payloads of first packets P_1 identified by the packet identifying unit 702.

The packet modifying unit 704 is coupled to the packet identifying unit 702 and the error-checking code processing unit 708, and is utilized for generating data D_1 of unmodified packets and data D_2' of modified packets to the storage module 706. In this exemplary embodiment, the packet modifying unit 704 modifies at least the payload of each of the specific packets P_2 to generate a corresponding modified packet, and then stores data of the modified packets to the storage module 706; in addition, the packet modifying unit 704 is also configured to generate a modified packet by replacing the original error-checking code transmitted via at least one first packet P_1 corresponding to the specific table section with an error checking result CR derived from performing the error check upon the specific table section. It should be noted that it is possible that one first packet P_1 may include both specific data and an original error-checking code, and a modified packet of such a first packet would have the specific data dropped or masked and an error checking result CR taking the place of the original error-checking code. This also obeys the spirit of the present invention. By referring to the error checking result CR of the modified specific table section generated from the packet processing apparatus 700, a following data processing stage can easily and directly know the error-checking status of the modified specific table section without performing any error check upon the modified specific table section.

After reading above paragraphs directed to the signal processing apparatus 100 shown in FIG. 1, a person skilled in the art can readily understand that the output of the packet identifying unit 702 in this embodiment is in a packet format, and the output of the packet modifying unit 704 may be a depacketized result or in a packet format, depending upon design requirements. Further description is therefore omitted here for brevity.

To more clearly describe technical features of the exemplary embodiment shown in FIG. 8, the following takes TS packets complying with ATSC standard as an example. The packet identifying unit 702 identifies any PSIP packet having a payload carrying data of a VCT section. The error-checking code processing unit 708 is implemented to deal with a CRC code of the VCT section. That is, the error-checking code processing unit 708 performs a CRC upon the VCT section according to an original 32-bit CRC code included in the end of the VCT section, and then obtains an error checking result CR of performing the CRC upon the VCT section. The packet modifying unit 704 detects the specific data including at least one specific descriptor of the VCT section. In one exemplary implementation, the packet modifying unit 704 modifies the payload of each of the second packets P_2 by dropping data of the at least one specific descriptor (e.g., the SLD data). In another exemplary implementation, the packet modifying unit 704 modifies the payload of each of the second packets P_2 by replacing data of the at least one specific descriptor (e.g., the SLD data) with a predetermined data pattern (e.g., 0x00) which acts as a mask. Besides, the packet modifying unit 704 further replaces the original 32-bit CRC code transmitted via a PSIP packet corresponding to the VCT section with the error checking result CR. In this way, the accuracy of the CRC is retained.

Figure 9:
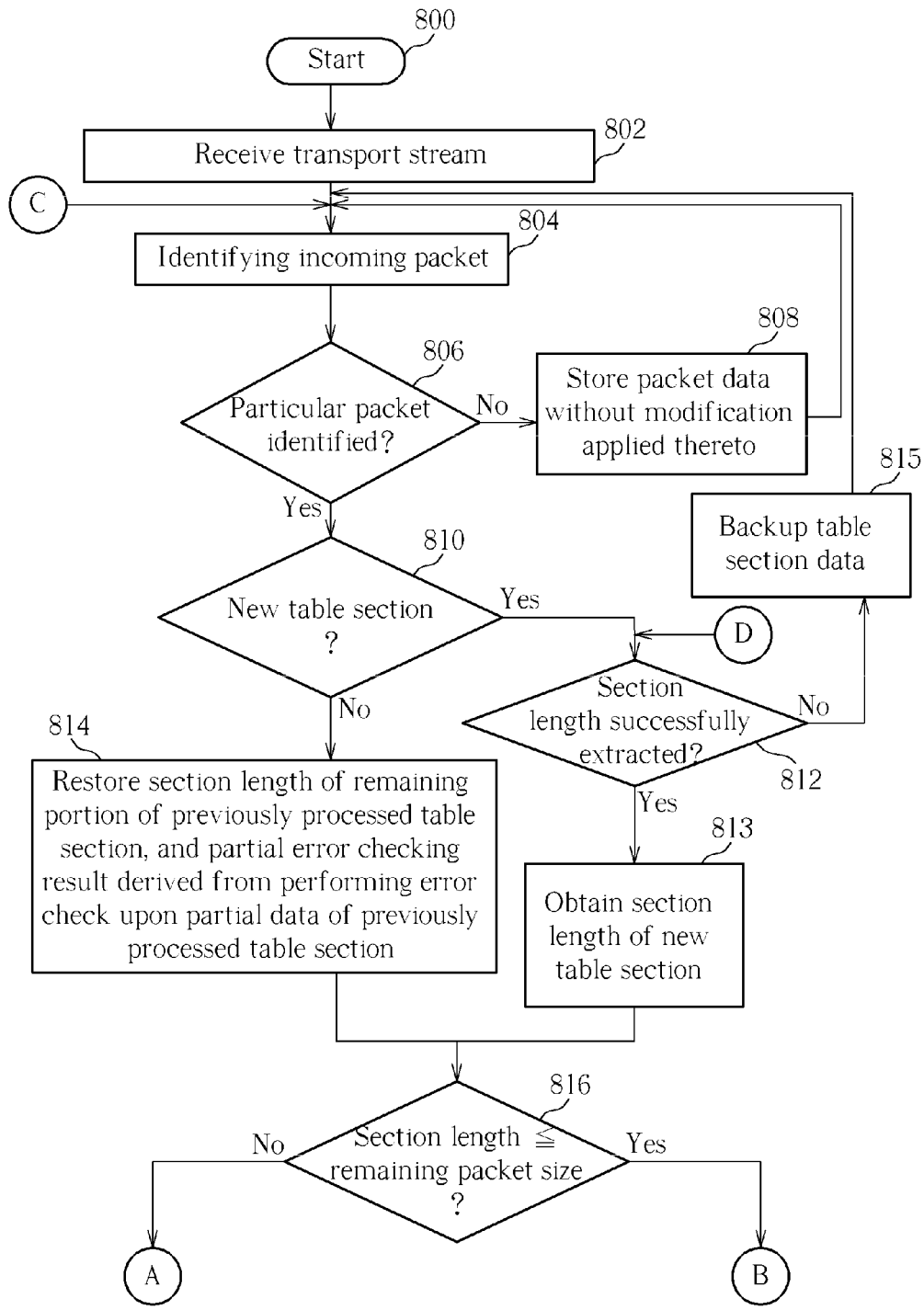
FIG. 9 is a flowchart illustrating a second exemplary embodiment of a packet processing method according to the present invention.
Figure 10:
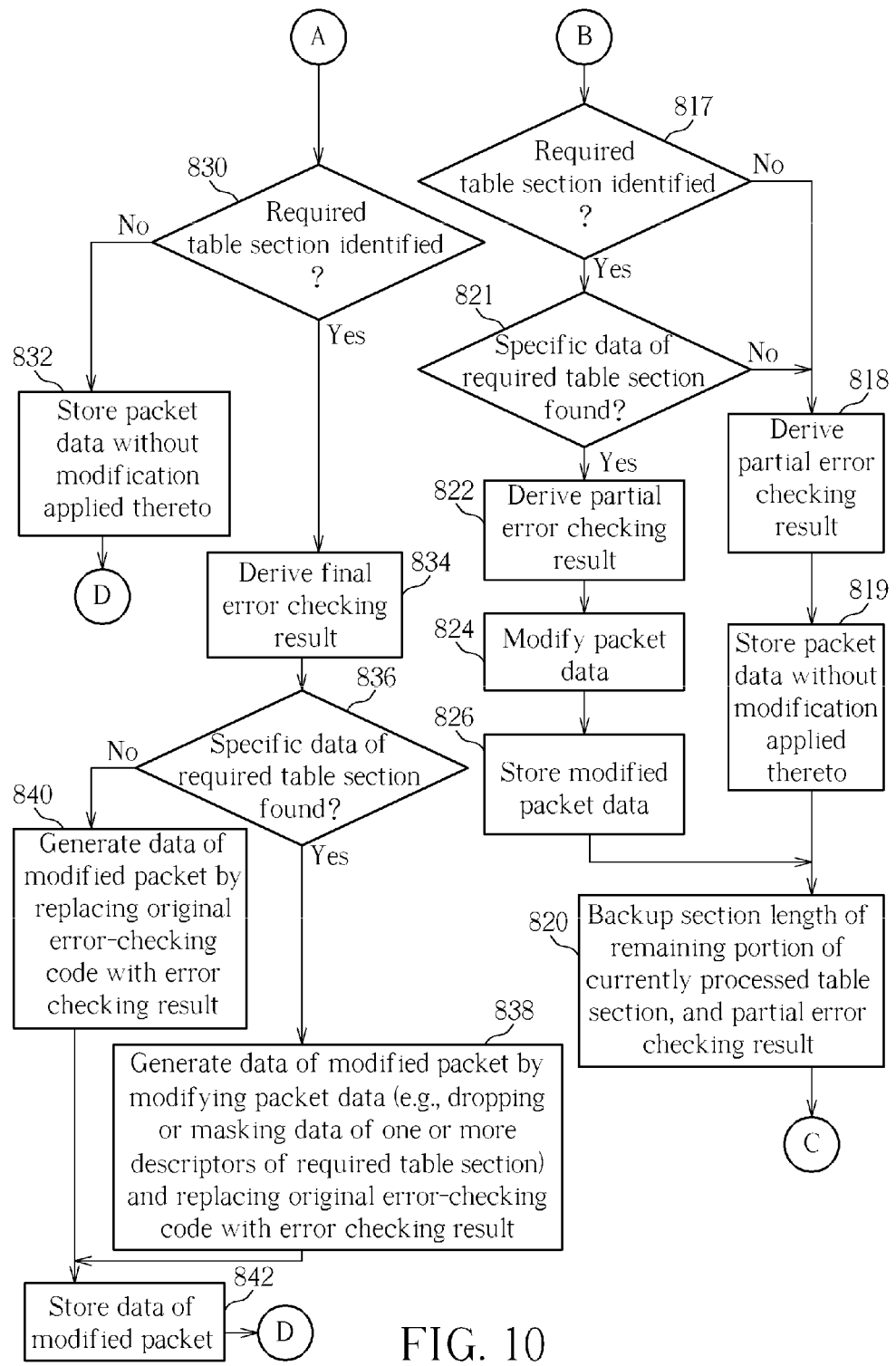
FIG. 10 shows a continued flow of FIG. 9.

Please refer to FIG. 9 in conjunction with FIG. 10. FIG. 9 is a flowchart illustrating a second exemplary embodiment of a packet processing method according to the present invention. FIG. 10 shows a continued flow of FIG. 9. Provided that the result is substantially the same, the steps are not required to be performed in the exact order shown in FIG. 9 and FIG. 10. In this exemplary embodiment, the method is employed by the packet processing apparatus 700 shown in FIG. 8. The exemplary method of the present invention includes following steps:

Step 800: Start.
Step 802: Receive a transport stream generated from a preceding data processing stage (e.g., a demodulator block), where the transport stream transmits a plurality of packets (i.e., transport stream packets) successively.
Step 804: Perform a packet header detection upon the transport stream for identifying an incoming packet transmitted via the transport stream.
Step 806: Check a PID value of the incoming packet to see if the incoming packet is a particular packet (e.g., a PSIP packet). If yes, go to step 810; otherwise, go to step 808.
Step 808: Store the packet without any modification applied thereto, and then go to step 804 to identify the next incoming packet transmitted via the transport stream.
Step 810: Check if an initial data of the payload of the particular packet contains information of a new table section whose section length is not successfully extracted yet. If yes, go to step 812; otherwise, go to step 814.

Step 812: Check if a section length of a new table section can be successfully derived from the particular packet. If yes, go to step 813; otherwise, go to step 815.
Step 813: Obtain a section length of a new table section. For example, the section length of the new table section may be derived from the processing of table section data included in one particular packet, or derived from the processing of table section data and continued table section data respectively included in different packets. Go to step 816.
Step 814: Restore a section length of a remaining portion of a previously processed table section, and a partial error checking result derived from performing an error check upon partial data of the previously processed table section. Go to step 816.
Step 815: Backup table section data required for obtaining a section length, and go to step 804.
Step 816: Check if the section length is equal to or less than a size of a non-processed portion of the particular packet, where the non-processed portion of the particular packet may include all or partial data of the particular packet. If yes, go to step 830; otherwise, go to step 817.
Step 817: Check if the non-processed portion of the particular packet includes data of a required table section (e.g., a VCT section). If yes, go to step 821; otherwise, go to step 818.
Step 818: Derive a partial error checking result from performing an error check upon the data of the non-processed portion of the particular packet.
Step 819: Store data of the non-processed portion of the particular packet without any modification applied thereto.
Step 820: Backup a section length of a remaining portion of the currently processed table section, and the partial error checking result. Go to step 804 to identify the next incoming packet transmitted via the transport stream.
Step 821: Check if the non-processed portion of the particular packet includes specific data of the required table section. If yes, go to step 822; otherwise, go to step 818. For example, the VCT section is checked to see if the non-processed portion of the particular packet contains data of one or more descriptors. Alternatively, a descriptor tag of each descriptor in the VCT section is checked to see if the non-processed portion of the particular packet contains data of one or more target descriptors, such as SLD data.
Step 822: Derive a partial error checking result from performing an error check upon the data of the non-processed portion of the particular packet.
Step 824: Modify the data of the non-processed portion of the particular packet to generate a modified portion of a modified packet corresponding to the particular packet. For example, the modified portion of the corresponding modified packet is generated by dropping or masking data of one or more target descriptors of the required table section.
Step 826: Store data of the modified portion of the modified packet. Go to step 820.
Step 830: Check if data of the section length includes data of a required table section. If yes, go to step 834; otherwise, go to step 832.
Step 832: Store the data of the section length without data modification applied thereto, and then go to step 812 to process a next table section including all or partial data transmitted via the same particular packet.
Step 834: Perform an error check upon the data of the section length with referring to the partial error checking result to derive an error checking result.
Step 836: Check if data of the section length includes specific data of the required table section. If yes, go to step 838; otherwise, go to step 840. For example, the VCT section is checked to see if the data of the section length contains one or more descriptors. Alternatively, a descriptor tag of each descriptor included in the VCT section is checked to see if the data of the section length contains one or more target descriptors.

Step 838: Generate data of a modified packet corresponding to the particular packet by modifying the specific data of the section length (e.g., dropping or masking specific data of one or more descriptors of the required table section) and replacing the original error-checking code with the error checking result. Go to step 842.

Step 840: Generate data of a modified packet corresponding to the particular packet by replacing the original error-checking code with the error checking result.

Step 842: Store the data of the modified packet, and then go to step 812 to process a next table section including all or partial data transmitted via the same particular packet.

As mentioned above, a table section may have data transmitted by one or more packets of the transport stream, and a section length of the table section therefore can be referenced to identify the end of the table section, which facilitates the data processing of the table section. For example, the packet identifying unit 702, the packet modifying unit 704 and the error-checking code processing unit 708 can easily know if the input data is an end of a required table section by referring to the section length of the required table section. Specifically, the section length can provide useful information to the packet identifying unit 702. Thus, in addition to checking a table ID of a required table section whose data are transmitted via more than one packet, the packet identifying unit 702 can refer to a section length of the required table section to know if a payload of an identified particular packet carries data of the required table section.

To put it simply, no matter whether the payload of a particular packet (e.g., a PSIP packet) carries all or partial data of a table section, the flow shown in FIG. 9 and FIG. 10 is capable of modifying a payload of each particular packet which transmits specific data of a required table section (e.g., SLD data of a VCT section) to achieve the objective of pre-processing the unwanted information. More specifically, when the payload of the identified particular packet contains specific data of a required table section and an error-checking code corresponding to the required table section, a corresponding modified packet is generated by modifying the specific data of the required table section (e.g., dropping or masking data of one or more descriptors of the required table section) and replacing the original error-checking code with an error checking result derived from performing an error check upon the required table section; when the payload of the identified particular packet contains specific data of the required table section without the error-checking code corresponding to the required table section include therein, a corresponding modified packet is generated by modifying the specific data of the required table section (e.g., dropping or masking data of one or more descriptors of the required table section); and when the payload of the identified particular packet contains the error-checking code corresponding to the required table section without specific data of the required table section, a corresponding modified packet is generated by replacing the original error-checking code with an error checking result derived from performing an error check upon the required table section.

It should be noted that the flow shown in FIG. 9 and FIG. 10 is employed to process a transport stream. Thus, the flow shown in FIG. 9 and FIG. 10 will check the incoming data to thereby process each packet received by the packet processing apparatus 700. The major difference between the first exemplary embodiment and second exemplary embodiment of the packet processing method is that the error-checking functionality is taken into consideration in the second exemplary embodiment of the packet processing method. As a person skilled in the art can readily understand the operation of each step shown in FIG. 9 and FIG. 10 after reading above paragraphs directed to the packet processing apparatus 700 shown in FIG. 8 and the flow shown in FIG. 9 and FIG. 10, further description is omitted here for brevity.

Figure 11:
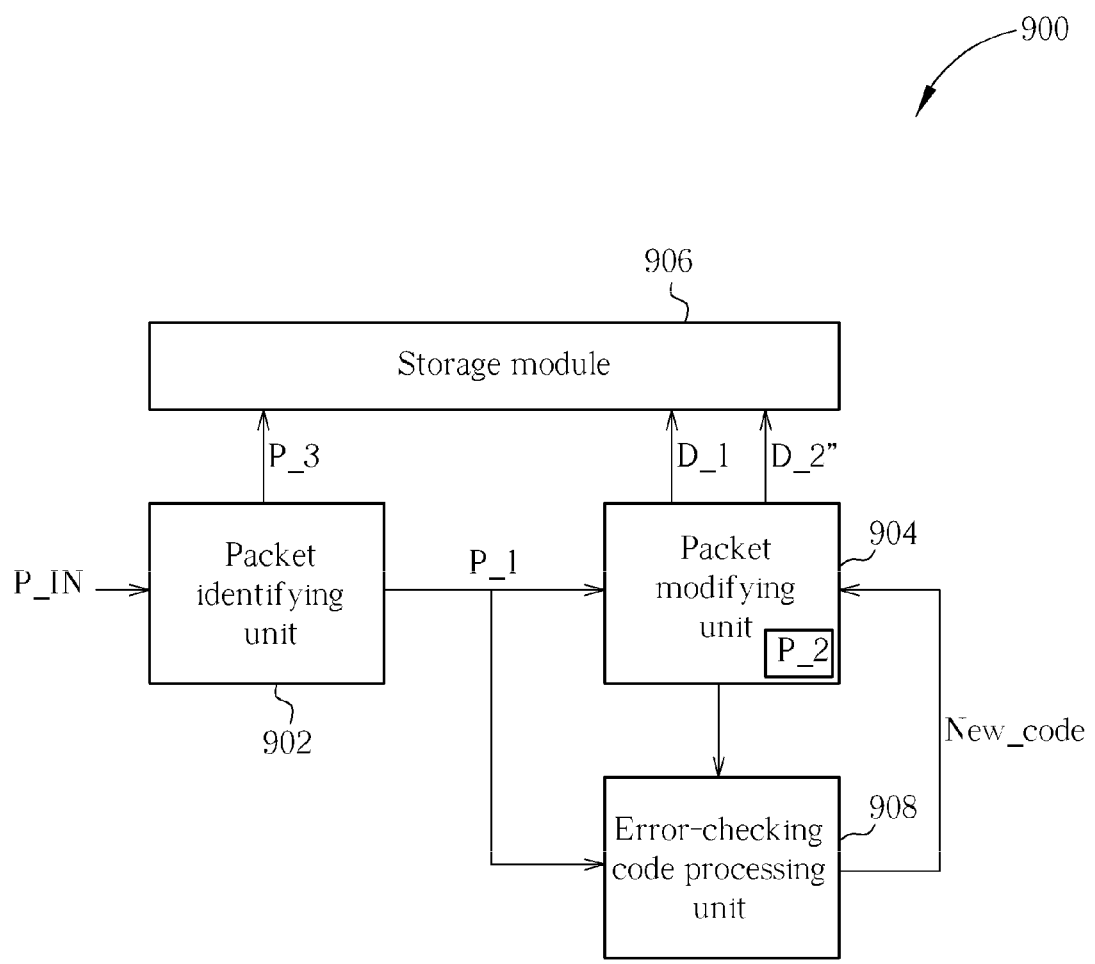
FIG. 11 is a block diagram of a third exemplary embodiment of a packet processing apparatus according to the present invention.

FIG. 11 is a block diagram of a third exemplary embodiment of a packet processing apparatus according to the present invention. The exemplary packet processing apparatus 900 includes, but is not limited to, a packet identifying unit 902, a packet modifying unit 904, a storage module 906, and an error-checking code processing unit 908. As the operation and function of the packet identifying unit 902 are identical to that of the packet identifying unit 102 shown in FIG. 1 and the operation and function of the storage module 906 are identical to that of the storage module 106 shown in FIG. 1, further description is therefore omitted here for brevity.

The packet modifying unit 904 is coupled to the packet identifying unit 902 and the error-checking code processing unit 908, and is utilized for generating data D_1 of unmodified packets and data D_2" of modified packets to the storage module 906. In this exemplary embodiment, the packet modifying unit 904 modifies at least the payload of each of the second packet P_2 to generate a modified packet, and then stores data of the modified packets to the storage module 906. For example, the packet modifying unit 904 drops or masks specific data of a required table section; besides, when an error checking result of performing an error check (e.g., a cyclic redundancy check) upon the original specific table section, which is a specific data section, indicates that the original specific table section passes the error check, the error-checking code processing unit 908 generates an updated error-checking code New_code in response to the modified specific table section, and the packet modifying unit 904 generates a modified packet by replacing the original error-checking code transmitted via at least one first packet P_1 corresponding to the specific table section with the updated error-checking code New_code generated from the error-checking code processing unit 908. It should be noted that it is possible that one first packet P_1 may include both specific data and an error-checking code, and a modified packet of such a first packet would have specific data dropped or masked and an updated error-checking code New_code taking the place of the original error-checking code. This also obeys the spirit of the present invention. In this way, when the following data processing stage performs an error check upon a modified specific table section, the modified specific table section will pass the error check due to the updated error-checking code New_code included therein.

If the error checking result of performing the error check upon the original specific table section indicates that the original specific table section fails to pass the error check, implying that the original specific table section has error bit(s) included therein, the packet modifying unit 904 in one exemplary implementation would still modify payloads of the specific packets P_2 corresponding to the original specific table section; however, the original error-checking code transmitted via at least one first packet P_1 remains intact. When the following data processing stage performs an error check upon a modified specific table section, the modified specific table section will fail to pass the error check due to the original error-checking code included therein. In this way, the accuracy of the CRC is retained. Please note that this is for illustrative purposes only, and is not meant to be a limitation to the scope of the present invention. In other words, other schemes dealing with the case where the original specific table section fails to pass the error check are also feasible.

To more clearly describe technical features of the exemplary embodiment shown in FIG. 11, the following takes TS packets complying with ATSC standard as an example. The packet identifying unit 902 identifies any PSIP packet having a payload carrying data of a VCT section. The error-checking code processing unit 908 is implemented for dealing with a CRC code of the VCT section. That is, the error-checking code processing unit 908 performs a CRC upon the VCT section according to an original 32-bit CRC code included in the end of the VCT section to determine data correctness of the VCT section. When the VCT section passes the CRC, the error-checking code processing unit 908 generates an updated 32-bit CRC code New_code in response to a modified VCT section generated by the packet modifying unit 904 which modifies payloads of second packets P_2 corresponding to the VCT section. Specifically, the packet modifying unit 904 detects specific data including at least one specific descriptor of the required table section, such as SLD data of the VCT section. In one exemplary implementation, the packet modifying unit 904 modifies the payload of each of the second packets P_2 by dropping data of the at least one specific descriptor (e.g., the SLD data). In another exemplary implementation, the packet modifying unit 904 modifies the payload of each of the second packets P_2 by replacing data of the at least one specific descriptor (e.g., the SLD data) with a predetermined data pattern (e.g., 0x00) which acts as a mask. Furthermore, after receiving the updated 32-bit CRC code New_code from the error-checking code processing unit 908, the packet modifying unit 904 replaces the original 32-bit CRC code transmitted via at least one first packet P_1 corresponding to the VCT section by the updated 32-bit CRC code New_code. However, when the original VCT section is found having error bit(s) included therein, the packet modifying unit 904 will keep the original 32-bit CRC code unchanged to inform the following data processing stage of the existence of error bit(s).

Figure 12:
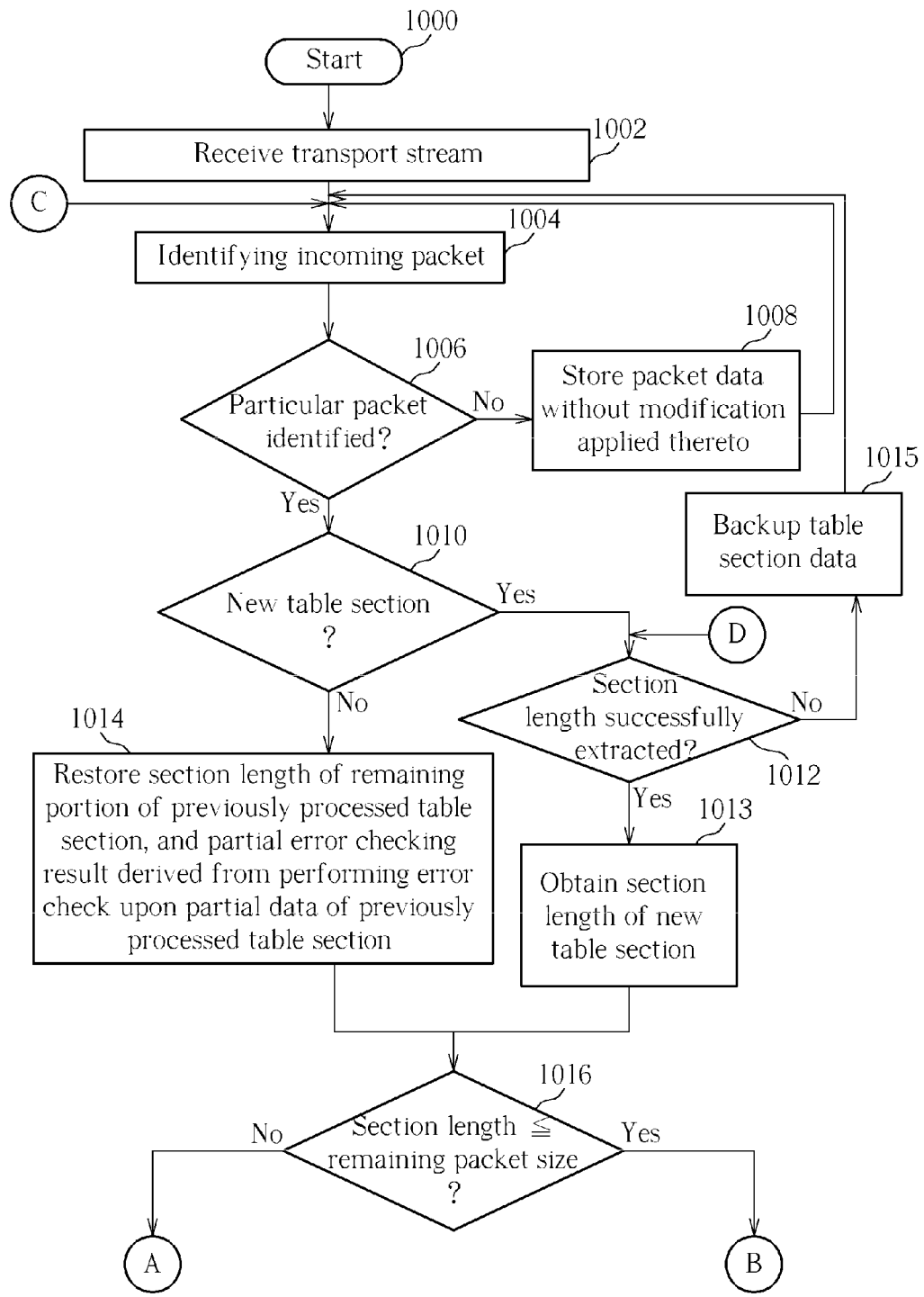
FIG. 12 is a flowchart illustrating a third exemplary embodiment of a packet processing method according to the present invention.
Figure 13:
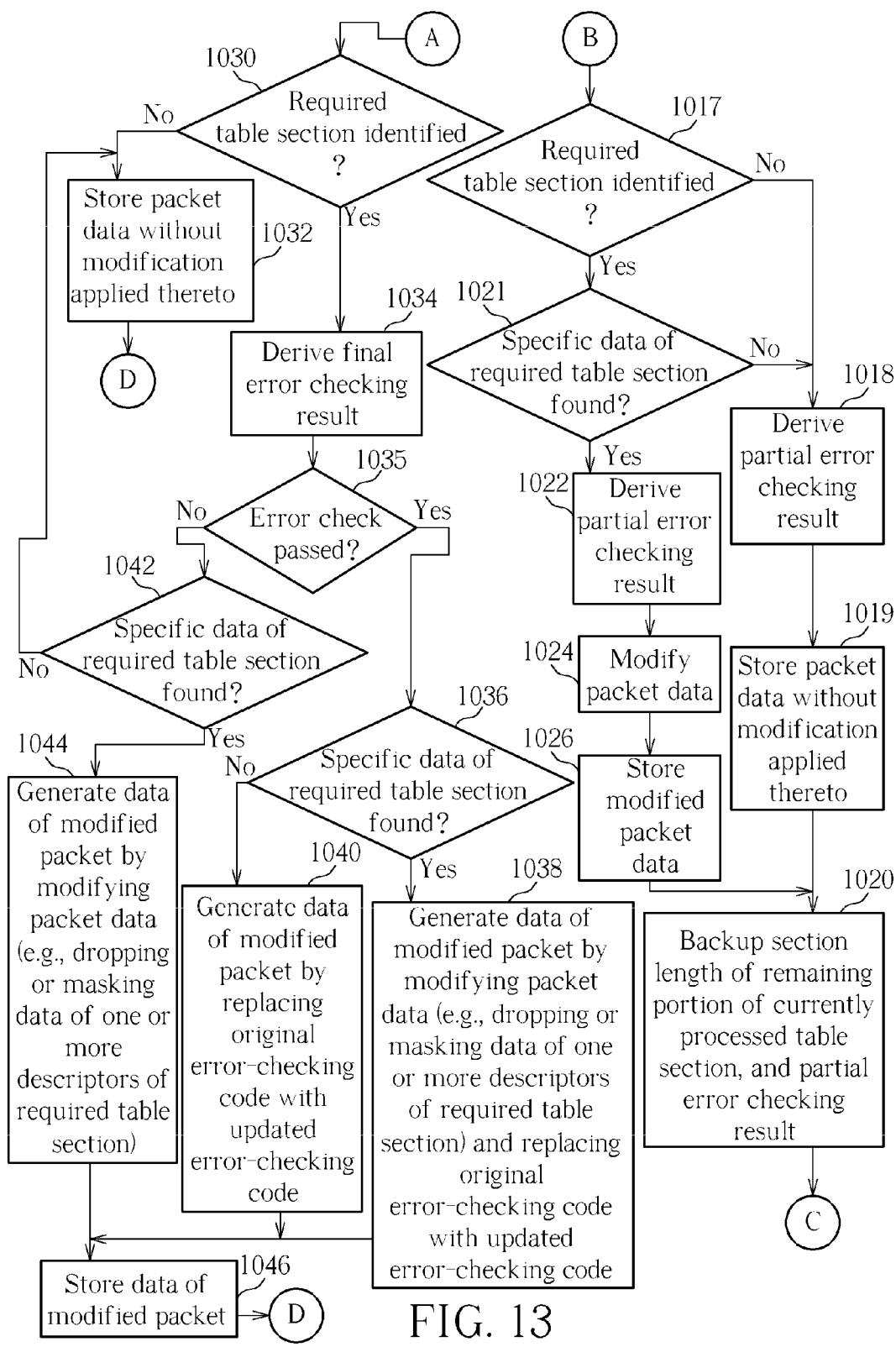
FIG. 13 shows a continued flow of FIG. 12.

Please refer to FIG. 12 and FIG. 13. FIG. 12 is a flowchart illustrating a third exemplary embodiment of a packet processing method according to the present invention. FIG. 13 shows a continued flow of FIG. 12. Provided that the result is substantially the same, the steps are not required to be performed in the exact order shown in FIG. 12 and FIG. 13. In this exemplary embodiment, the method is employed by the packet processing apparatus 900 shown in FIG. 11. The exemplary method of the present invention includes following steps:

Step 1000: Start.

Step 1002: Receive a transport stream generated from a preceding data processing stage (e.g., a demodulator block), where the transport stream transmits a plurality of packets (i.e., transport stream packets) successively.

Step 1004: Perform a packet header detection upon the transport stream for identifying an incoming packet transmitted via the transport stream.

Step 1006: Check a PID value of the incoming packet to see if the incoming packet is a particular packet (e.g., a PSIP packet). If yes, go to step 1010; otherwise, go to step 1008.

Step 1008: Store the packet without any modification applied thereto, and then go to step 1004 to identify the next incoming packet transmitted via the transport stream.

Step 1010: Check if an initial data of the payload of the particular packet contains information of a new table section whose section length is not successfully extracted yet. If yes, go to step 1012; otherwise, go to step 1014.

Step 1012: Check if a section length of a new table section can be successfully derived from the particular packet. If yes, go to step 1013; otherwise, go to step 1015.

Step 1013: Obtain a section length of a new table section. For example, the section length of the new table section may be derived from the processing of table section data included in one particular packet, or derived from the processing of table section data and continued table section data respectively included in different packets. Go to step 1016.

Step 1014: Restore a section length of a remaining portion of a previously processed table section, and a partial error checking result derived from performing an error check upon partial data of the previously processed table section. Go to step 1016.

Step 1015: Backup table section data required for obtaining a section length, and go to step 1004.

Step 1016: Check if the section length is equal to or less than a size of a non-processed portion of the particular packet, where the non-processed portion of the particular packet may include all or partial data of the particular packet, depending upon the actual processing status of the particular packet. If yes, go to step 1030; otherwise, go to step 1017.

Step 1017: Check if the non-processed portion of the particular packet includes data of a required table section (e.g., a VCT section). If yes, go to step 1021; otherwise, go to step 1018.

Step 1018: Derive a partial error checking result from performing an error check upon the data of the non-processed portion of the particular packet.

Step 1019: Store data of the non-processed portion of the particular packet without any modification applied thereto.

Step 1020: Backup a section length of a remaining portion of the currently processed table section, and the partial error checking result. Go to step 1004 to identify the next incoming packet transmitted via the transport stream.

Step 1021: Check if the non-processed portion of the particular packet includes specific data of the required table section. If yes, go to step 1022; otherwise, go to step 1018. For example, the VCT section is checked to see if the non-processed portion of the particular packet contains data of one or more descriptors. Alternatively, a descriptor tag of each descriptor in the VCT section is checked to see if the non-processed portion of the particular packet contains data of one or more target descriptors, such as SLD data.

Step 1022: Derive a partial error checking result from performing an error check upon the data of the non-processed portion of the particular packet.

Step 1024: Modify the data of the non-processed portion of the particular packet to generate a modified portion of a modified packet corresponding to the particular packet. For example, the modified portion of the corresponding modified packet is generated by dropping or masking data of one or more descriptors of the required table section.

Step 1026: Store data of the modified portion of the modified packet. Go to step 1020.

Step 1030: Check if data of the section length includes data of a required table section. If yes, go to step 1034; otherwise, go to step 1032.

Step 1032: Store the data of the section length without data modification applied thereto, and then go to step 1012 to process a next table section including all or partial data transmitted via the same particular packet.

Step 1034: Perform an error check upon the data of the section length with referring to the partial error checking result to derive an error checking result.

Step 1035: Check the error checking result to see if the required table section passes the error check. If yes, go to step 1036; otherwise, go to step 1042.

Step 1036: Check if data of the section length includes specific data of the required table section. If yes, go to step 1038; otherwise, go to step 1040. For example, the VCT section is checked to see if the data of the section length contains one or more descriptors. Alternatively, a descriptor tag of each descriptor in the VCT section is checked to see if the data of the section length contains one or more target descriptors.

Step 1038: Generate data of a modified packet corresponding to the particular packet by modifying the data of the section length (e.g., dropping or masking data of one or more descriptors of the required table section) and replacing the original error-checking code with an updated error-checking code generated in response to modified specific data of the required table section. Go to step 1046.

Step 1040: Generate data of a modified packet corresponding to the particular packet by replacing the original error-checking code with an updated error-checking code generated in response to modified specific data of the required table section. Go to step 1046.

Step 1042: Check if data of the section length includes specific data of the required table section. If yes, go to step 1044; otherwise, go to step 1032. For example, the VCT section is checked to see if the data of the section length contains one or more descriptors. Alternatively, a descriptor tag of each descriptor in the VCT section is checked to see if the data of the section length contains one or more target descriptors.

Step 1044: Generate data of a modified packet corresponding to the particular packet by modifying the data of the section length (e.g., dropping or masking data of one or more descriptors of the required table section). Go to step 1046.

Step 1046: Store the data of the modified packet, and then go to step 1012 to process a next table section including all or partial data transmitted via the same particular packet.

As mentioned above, a table section may have data transmitted by one or more packets of the transport stream, and a section length of the table section can be referenced to identify the end of the table section, which facilitates the data processing of the table section. For example, the packet identifying unit 902, the packet modifying unit 904 and the error-checking code processing unit 908 can easily know if the input data is an end of a required table section by referring to the section length of the required table section. Specifically, the section length can provide useful information to the packet identifying unit 902. Thus, in addition to checking a table ID of a required table section whose data are transmitted via more than one packet, the packet identifying unit 902 can refer to a section length of the required table section to know if a payload of an identified particular packet carries data of the required table section.

To put it simply, no matter whether the payload of a particular packet (e.g., a PSIP packet) carries all or partial data of a table section, the flow shown in FIG. 12 and FIG. 13 is capable of modifying a payload of each particular packet which transmits specific data of a required table section (e.g., SLD data of a VCT section) to achieve the objective of pre-processing the unwanted information.

More specifically, when the payload of the identified particular packet contains specific data of a required table section and an error-checking code which indicates that the corresponding required table section passes the error check, a corresponding modified packet is generated by modifying the specific data of the required table section (e.g., dropping or masking data of one or more descriptors of the required table section) and replacing the original error-checking code with an updated error-checking code generated in response to modified specific data of the required table section; when the payload of the identified particular packet contains specific data of a required table section without an error-checking code included therein, a corresponding modified packet is generated by modifying the specific data of the required table section (e.g., dropping or masking data of one or more descriptors of the required table section); and when the payload of the identified particular packet contains an error-checking code which indicates that the corresponding required table section passes the error check without a specific data of the required table section, a corresponding modified packet is generated by replacing the original error-checking code with an updated error-checking code generated in response to modified specific data of the required table section.

It should be noted that the flow shown in FIG. 12 and FIG. 13 is employed to process a transport stream. Thus, the flow shown in FIG. 12 and FIG. 13 will check the incoming data to thereby process each packet received by the packet processing apparatus 900. The major difference between the second exemplary embodiment and third exemplary embodiment of the packet processing method is the modification manner of the error-correction code. As a person skilled in the art can readily understand the operation of each step shown in FIG. 12 and FIG. 13 after reading above paragraphs directed to the packet processing apparatus 900 shown in FIG. 11 and the flow shown in FIG. 12 and FIG. 13, further description is omitted here for brevity.

Please note that when one or more descriptors of the required table section are dropped, the actual data amount is changed accordingly. Therefore, any related data length field/parameter should be adjusted accordingly. Moreover, in one exemplary implementation, the elements of the exemplary packet processing apparatus 100, 700, 900 can be external to the demodulator block and the demultiplexer block; however, in an alternative implementation, the elements of the exemplary packet processing apparatus can be partially or fully integrated in the demodulator block, or partially or fully integrated in the demultiplexer block. These all fall within the scope of the present invention.

By way of example, the identification processing performed by the packet identifying units 102, 702, 902 and the modification processing performed by the packet modifying units 104, 704, 904 may employ a packet-based processing scheme or a byte-based processing scheme, depending upon the actual design consideration. In a case where the packet-based processing scheme is employed, the packet identifying units 102, 702, 902 would check each incoming complete packet to determine how to deal with the received complete packet, and the packet modifying units 104, 704, 904 would check each incoming complete packet to determine how to deal with the received complete packet. In another case where the byte-based processing scheme is employed, the packet identifying units 102, 702, 902 would check each incoming byte to determine how to deal with the received byte, and the packet modifying units 104, 704, 904 would check each incoming byte to determine how to deal with the received byte. In this way, data processing of a packet is allowed to begin prior to receiving the whole data of the packet; in other words, the packet data processing, including the identification processing and the modification processing, does not need to wait for the data reception of a complete packet. However, the packet data processing scheme (e.g., a packet-based processing scheme or a byte-based processing scheme)

employed by the packet identifying units 102, 702, 902 and the packet modifying units 104, 704, 904 is not meant to be taken as a limitation to the scope of the present invention. That is, as long as the same objective of pre-processing the unwanted information (e.g., SLD data of a VCT section) via the co-working packet modifying unit and packet modifying unit is achieved, the transport stream data can be processed on a byte basis, on a packet basis, or on the basis of any data size. These all fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A packet processing apparatus, comprising:
   a packet identifying unit, for receiving a plurality of packets and checking identification information and data length information which are derived from the received packets to identify first packets from the received packets; and
   a packet modifying unit, coupled to the packet identifying unit, for checking payloads of the first packets that are identified from the received packets to identify second packets from the first packets, where each of the second packets has specific data included in a payload thereof, and for modifying at least the payload of each of the second packets that are identified and selected from the first packets;
   wherein any packet in the first packets that is not selected as a second packet is not modified by the packet modifying unit, a payload of each of the first packets carries data of a table section, and a payload of each of the second packets carries data of at least one descriptor of the table section.

2. The packet processing apparatus of claim 1, further comprising:
   a storage module, coupled to the packet modifying unit, for storing data of modified packets respectively corresponding to the second packets;
   wherein data of each of the second packet identified through the packet identifying unit and the packet modifying unit are not stored into the storage module unless modified by the packet modifying unit.

3. The packet processing apparatus of claim 1, wherein each of the first packets is a program and system information (PSIP) packet, the specific data include data of at least one specific descriptor of a specific table section, and the data length information includes a section length of the specific table section.

4. The packet processing apparatus of claim 3, wherein the specific table section is a virtual channel table (VCT) section.

5. The packet processing apparatus of claim 4, wherein the at least one specific descriptor includes a service location descriptor.

6. The packet processing apparatus of claim 3, wherein the packet modifying unit modifies each of the second packets by dropping the data of the at least one specific descriptor.

7. The packet processing apparatus of claim 3, wherein the packet modifying unit modifies each of the second packets by replacing data of the at least one specific descriptor with a predetermined data pattern.

8. The packet processing apparatus of claim 1, wherein the payloads of the first packets contain an original error-checking code of a specific data section, the specific data include data of the specific data section, and the packet processing apparatus further comprises:
   an error-checking code processing unit, for performing an error check upon the specific data section according to the original error-checking code, wherein the packet modifying unit further modifies the original error-checking code.

9. The packet processing apparatus of claim 8, wherein the error-checking code processing unit generates an error checking result of performing the error check upon the specific data section, and the packet modifying unit replaces the original error-checking code transmitted via at least one first packet corresponding to the specific data section with the error checking result.

10. The packet processing apparatus of claim 8, wherein when an error checking result of performing the error check upon the specific data section indicates that the specific data section passes the error check, the error-checking code processing unit generates an updated error-checking code for a modified specific data section corresponding to the specific data section, and the packet modifying unit replaces the original error-checking code transmitted via at least one first packet corresponding to the specific data section with the updated error-checking code.

11. A packet processing method employed in a packet processing apparatus, comprising:
   receiving a plurality of packets and checking identification information and data length information which are derived from the received packets to identify first packets from the received packets;
   checking payloads of the first packets that are identified from the received packets to identify second packets from the first packets, where each of the second packets has specific data included in a payload thereof; and
   modifying at least the payload of each of the second packets that are identified and selected from the first packets;
   wherein any packet in the first packets that is not selected as a second packets is not processed by the modifying step, a payload of each of the first packets carries data of a table section, and a payload of each of the second packets carries data of at least one descriptor of the table section.

12. The packet processing method of claim 11, further comprising:
   utilizing a storage module to store data of modified packets respectively corresponding to the second packets;
   wherein data of each of the second packet are not stored into the storage device unless modified to become data of the corresponding modified packet.

13. The packet processing method of claim 11, wherein each of the first packets is a program and system information (PSIP) packet, the specific data include data of at least one specific descriptor of a specific table section, and the data length information includes a section length of the specific table section.

14. The packet processing method of claim 13, wherein the specific table section is a virtual channel table (VCT) section.

15. The packet processing method of claim 14, wherein the at least one specific descriptor includes a service location descriptor.

16. The packet processing method of claim 13, wherein modifying each of the second packets comprises:
   dropping the data of the at least one specific descriptor.

17. The packet processing method of claim 13, wherein modifying each of the second packets comprises:
   replacing data of the at least one specific descriptor with a predetermined data pattern.

18. The packet processing method of claim 11, wherein the payloads of the first packets contain an original error-checking code of a specific data section, the specific data include data of the specific data section, and the packet processing method further comprises:

> performing an error check upon the specific data section according to the original error-checking code; and
> 
> modifying the original error-checking code.

19. The packet processing method of claim 18, wherein modifying the original error-checking code comprises:

> replacing the original error-checking code transmitted via at least one first packet corresponding to the specific data section with an error checking result of performing the error check upon the specific data section.

20. The packet processing method of claim 18, further comprising:

> when an error checking result of performing the error check upon the specific data section indicates that the specific data section passes the error check, generating an updated error-checking code for a modified specific data section corresponding to the specific data section;
> 
> wherein modifying the original error-checking code comprises:
> 
> replacing the original error-checking code transmitted via at least one first packet corresponding to the specific data section with the updated error-checking code.

21. A packet processing apparatus, comprising:

a packet identifying unit, for receiving a plurality of packets and checking identification information and data length information which are derived from the received packets to identify first packets from the received packets;

a packet modifying unit, coupled to the packet identifying unit, for checking payloads of the first packets to identify second packets from the first packets, where each of the second packets has specific data included in a payload thereof, and for modifying at least the payload of each of the second packets, wherein the payloads of the first packets contain an original error-checking code of a specific data section, and the specific data include data of the specific data section; and an error-checking code processing unit, for performing an error check upon the specific data section according to the original error-checking code and generating an error checking result of performing the error check upon the specific data section;

wherein the packet modifying unit further refers to at least the error checking result to replace the original error-checking code transmitted via at least one first packet corresponding to the specific data section.

22. A packet processing method employed in a packet processing apparatus, comprising:

receiving a plurality of packets and checking identification information and data length information which are derived from the received packets to identify first packets from the received packets;

checking payloads of the first packets to identify second packets from the first packets, where each of the second packets has specific data included in a payload thereof, wherein the payloads of the first packets contain an original error-checking code of a specific data section, and the specific data include data of the specific data section;

modifying at least the payload of each of the second packets;

performing an error check upon the specific data section according to the original error-checking code, and generating an error checking result of performing the error check upon the specific data section; and referring to at least the error checking result to replace the original error-checking code transmitted via at least one first packet corresponding to the specific data section.

* * * * *